United States Patent
Neilsen et al.

(10) Patent No.: US 10,860,533 B1
(45) Date of Patent: Dec. 8, 2020

(54) FILE SIZE AS AN INDICATOR OF FILE PROPERTIES

(71) Applicant: AMAZON TECHNOLOGIES, INC., Seattle, WA (US)

(72) Inventors: Eric Neilsen, Lynnwood, WA (US); Paul David Franklin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 692 days.

(21) Appl. No.: 15/631,876

(22) Filed: Jun. 23, 2017

(51) Int. Cl.
*G06F 16/14* (2019.01)
*G06F 16/174* (2019.01)

(52) U.S. Cl.
CPC .......... *G06F 16/14* (2019.01); *G06F 16/1744* (2019.01)

(58) Field of Classification Search
CPC .......................... G06F 16/148; G06F 16/1744
USPC ........................................ 707/783, 827, 828
See application file for complete search history.

(56) References Cited

U.S. PATENT DOCUMENTS

| | | | | |
|---|---|---|---|---|
| 7,139,831 B1* | 11/2006 | Bogart | ................ | H04L 12/1868 709/237 |
| 8,924,353 B1* | 12/2014 | Patwardhan | .......... | G06F 16/113 707/640 |
| 2013/0073597 A1* | 3/2013 | Haff | ........................ | H04L 29/06 707/828 |
| 2013/0111182 A1* | 5/2013 | Aslot | .................... | G06F 3/0608 711/203 |
| 2014/0032915 A1* | 1/2014 | Muzammil | ........... | H04L 9/3236 713/176 |

* cited by examiner

Primary Examiner — Robert W Beausoliel, Jr.
Assistant Examiner — Pedro J Santos
(74) *Attorney, Agent, or Firm* — Lowenstein Sandler LLP

(57) ABSTRACT

A processing device receives a request to identify whether a file is a complete file. The processing device determines a first size of the file. The processing device determines whether the first size satisfies a size criterion. The processing device determines that the file is a complete file responsive to the determination that the first size satisfies the size criterion.

20 Claims, 9 Drawing Sheets

FILE SIZE AS AN INDICATOR OF FILE PROPERTIES

BACKGROUND

A sparse file is a type of computer file that attempts to use file system space more efficiently when blocks allocated to the file are mostly empty. This is achieved by writing brief information (metadata) representing the empty blocks to disk instead of the actual "empty" space which makes up the block, using less disk space (i.e. sparse files contain blocks of zeros whose existence is recorded, but have no space allocated on disk). The full block size is written to disk as the actual size when the block contains "real" (non-empty) data. Many modern file systems support sparse files, including most Unix® variants (e.g., ZFS) and New Technology file system (NTFS). Sparse files are sometimes used for disk images, database snapshots, and log files.

When reading sparse files, the file system transparently converts metadata representing empty blocks into "real" blocks filled with zero bytes at runtime. Applicants are unaware of this conversion. Accordingly, reads to sparse files return the logical or virtual size of the files rather than the actual physical size of those files. For example, Unix lacks a mechanism to identify whether or not a sparse file is full.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1A:
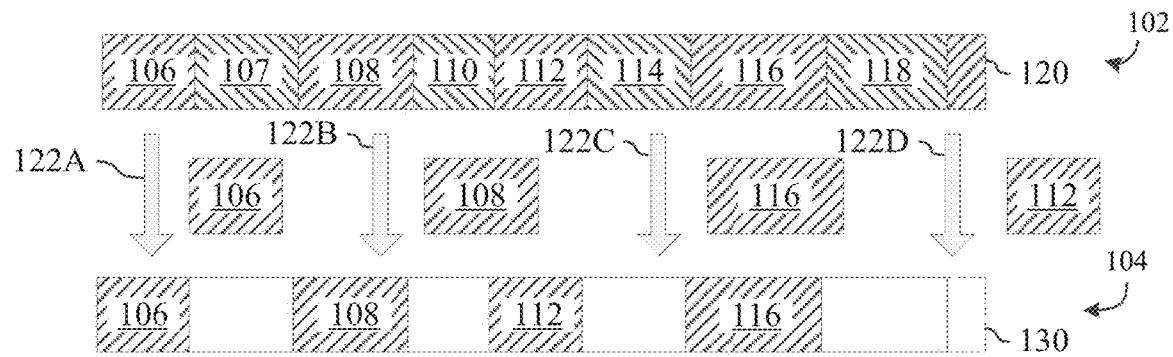
FIG. 1A illustrates generation and initial population of a destination file with portions of data, according to various embodiments of the present disclosure.

The present disclosure relates to techniques for determining a property of a file based on a file size of the file. One example property of a file that may be determined based on file size is file completeness. For example, a file may be identified as a complete file if a file size of the file matches a known file size of the file. However, if the file has a file size that is slightly larger or smaller than the known file size, then the file may be identified as an incomplete file. In another example, in some systems (e.g., such as those that use an encoding such as 16-bit Unicode Transformation Format (UTF-16)) valid files should have an even number of bytes. Files that have an odd number of bytes may be identified as incomplete, while files having an even number of bytes may be identified as complete. Other example properties that may be identified based on the file size includes file permissions, access rights, deletion status, archival status, whether a file has been verified, whether a file has been optimized, and so on. Other file size criteria may also be used to determine a property of a file. For example, a file may be determined to have a particular property if the file has a file size that is one of a known subset of valid file sizes, if the file size has a prime number of bytes, and so on.

In one embodiment, when data (e.g., a source file) is to be received by a first device from a second device, the first device generates a new file for the data, where the new file may be a sparse file. Alternatively, the new file may be given pre-allocated space to which data for the file will later be written (referred to herein as a pre-allocated file). The source file may have a first file size. The sparse file or pre-allocated that is generated to store the contents of the source file may be created with a file size that is slightly smaller or slightly larger than the first file size of the source file. All but the last portion of the data may be written into the sparse file or pre-allocated file having the second size. The first device may then receive a last portion of the data (e.g., a last one or a few bytes of the source file). If the second size of the sparse file or pre-allocated file is smaller than the first size of the data, then the size of the sparse file or pre-allocated file may be expanded from the second size to the first size (e.g., using standard sparse file sizing operations). The last portion may then be stored in the sparse file or pre-allocated file. At this point the sparse file or pre-allocated file is a complete file. If the second size of the sparse file or pre-allocated file is larger than the first size of the data, then the size of the sparse file or pre-allocated file may be truncated to the size of the data after the last portion has been stored in the sparse file or pre-allocated file. Again, at this point the sparse file becomes a complete file. Alternatively, if the second size is larger than the first size, all of the data may be written into the file in parallel. Once all of the data has been written, then the pre-allocated file may be shrunk from the second size to the first size.

At any time metadata of the new file may be checked to determine a file size of the file using standard filesystem operations. For example, an LS command may be used in Unix or Linux to determine the file size of one or more files. The file size that is returned may be compared to a size criterion to determine whether each of the one or more files are complete or incomplete and/or whether the files have other properties or states. For example, if a file has a first file size it may be identified as complete, and if the file has a second file size it may be identified as incomplete. In one example implementation, all valid files have an even number of bytes. Newly created sparse files and/or pre-allocated files may be created with an odd number of bytes. Alternatively, valid files may have a prime number of bytes, or may have specific file sizes. A simple LS command in Unix or Linux (or similar command in filesystems of other operating systems) may indicate for all files in a directory whether those files are complete or incomplete. Those files that have an odd number of bytes (or a non-prime number of bytes, or a file size that is not one of the specific file sizes) would be incomplete and those files that have an even number of bytes would be complete. In another example, a file may have an associated known file size. When a sparse file or pre-allocated file is generated, it may be generated with a file size other than the associated known file size. At any time the current file size of the file may be determined and then compared to the associated known file size (where the known associated file size is the size that the file should have). If the current file size is different than the associated known file size, then it may be determined that the file is incomplete. If the file sizes are the same, then it may be determined that the file is complete.

Additionally or alternatively, a subsystem of a filesystem may automatically generate a notice when a file size of a file changes. The change in file size may indicate that a particular file that was previously incomplete has become complete. Examples of file subsystems that may be used to determine changes in file size include inode notify (inotify) and dnotify in Linux.

Embodiments of the present invention enable a processing device to quickly and easily determine whether a file is a complete file or an incomplete file based on a file size of the file. The file completeness may be determined without opening the file, examining metadata of the file, or reading the bytes of the file and computing the total size of those bytes, which may be a resource expensive task. Additionally, other properties of the file may be determined based on the file size. One or more additional properties of a file may be determined instead of or in addition to file completeness.

Figure 1B:
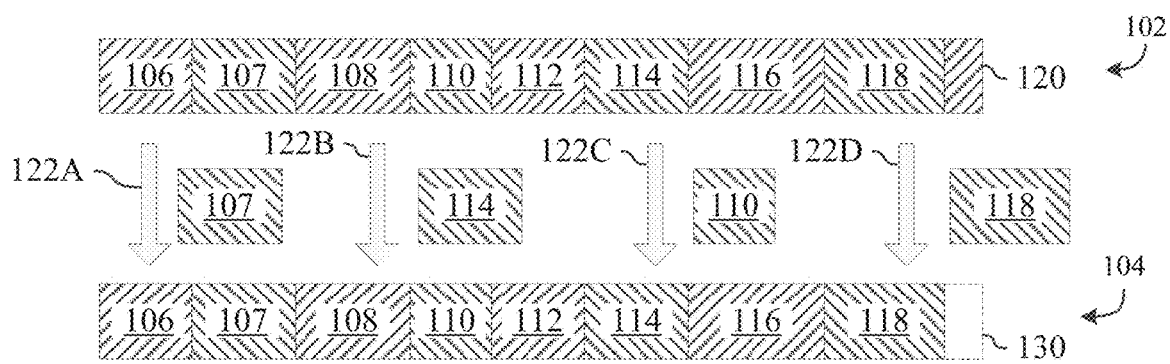
FIG. 1B illustrates further population of the destination file of FIG. 1A, according to various embodiments of the present disclosure.
Figure 1C:
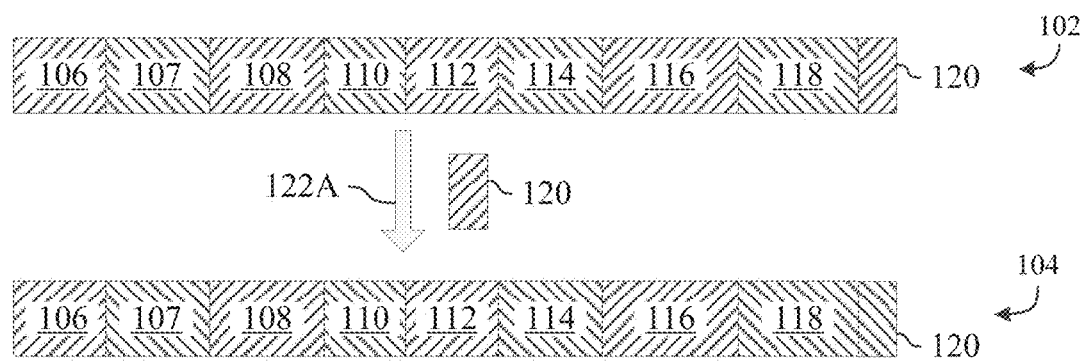
FIG. 1C illustrates expansion of the destination file of FIG. 1B and completion of the file, according to various embodiments of the present disclosure.

Referring now to the figures, FIGS. 1A-C illustrate the generation and data population of a destination file to store the contents of a source file, in accordance with various embodiments of the present disclosure. FIG. 1A illustrates generation and initial population of a destination file 104 with portions of data. As shown, contents of a source file 102 are to be copied to a destination file 104, where the destination file may be created as a sparse file. Alternatively, the destination file may be pre-allocated space for a file (e.g., may be a pre-allocated file that occupies a predefined amount of storage space but that does not include any data to begin with). For example, it may be desirable to store all of the blocks that constitute a file contiguously, but writes may occur out of order. If blocks of a file are located contiguously on disk, then reads of the data in the file may be performed with increased efficiency. Accordingly, the blocks to which a file will be written may be pre-allocated before all of the data of the file is written into those blocks. The pre-allocated blocks may be empty (e.g., may initially be written with all zeros) until they are populated with the data of the file. The data may then be written to those blocks in order or out of order. The resulting file will then be a contiguous file. The source file is composed of multiple portions 106, 107, 108, 110, 112, 114, 116, 118, 120 of data and has a first file size. The destination file 104 is created with a second file size that is smaller than the first file size. A difference in size between the first size and the second size is represented as dashed line 130. Alternatively, the destination file 104 may be created with a second file size that is larger than the first file size.

The source file 102 may be on a first computing device and the destination file 104 may be on a second computing device. Multiple connections 122A, 122B, 122C, 122D may be established between the first and second computing device. A separate thread may be instantiated for each of the connections 122A-D on the first computing device. Similarly, a separate thread may be instantiated for each of the connections 122A-D on the second computing device. Each thread on the second computing device may receive a particular portion of the data from a corresponding thread in the first computing device via a particular connection in parallel to other threads receiving other portions of data via other connections. As shown, portion 106 is received via connection 122A, portion 108 is received via connection 122B, portion 116 is received via connection 122C, and portion 112 is received via connection 122D.

FIG. 1B illustrates further population of the destination file 104 of FIG. 1A. As shown, portion 107 is received via connection 122A, portion 114 is received via connection 122B, portion 110 is received via connection 122C, and portion 118 is received via connection 122D. As shown, the order in which portions of data are received may not correspond to the order of placement of those portions in the destination file 104. For example, portion 116 may be received before portion 112. Similarly, portions 106, 108, 116 and 112 may be received before portions 107, 114, 110 and 118. However, proper arrangement of the portions of data in the destination file may be as follows: portion 106, portion 107, portion 108, portion 110, portion 112, portion 114, portion 116, portion 118, portion 120. Due to the fact that portions of data may be received out of order, a last portion 120 of the data may not be sent until after all of the other portions of the data have been stored in the destination file 104. This is because storing the last portion 120 of the data at the end of the destination file may trigger a resize of the destination file 104.

FIG. 1C illustrates expansion of the destination file 104 of FIG. 1B and completion of the destination file 104. As shown, the last portion 120 of data is sent to the second device over connection 122A. The destination file 104 is too small to accommodate the last file 120. Accordingly, a size of the destination file 104 is increased from the second size to the first size. The last portion 120 of data is then stored in the destination file 104. At this point the destination file 104 is a complete file.

In embodiments the file is not resized until all of the portions of data have been received. This enables the size of the destination file to be used to determine completeness of the destination file 104. Alternatively, the last portion 120 of data may be sent in parallel with other portions of data. In such an embodiment, the last portion may be written to a buffer in memory until a remainder of the portions of data have been stored in the destination file 104. Once all of the other portions of data have been stored in the destination file 104, then the last portion 120 may be stored from the buffer in the destination file 104.

Figure 2:
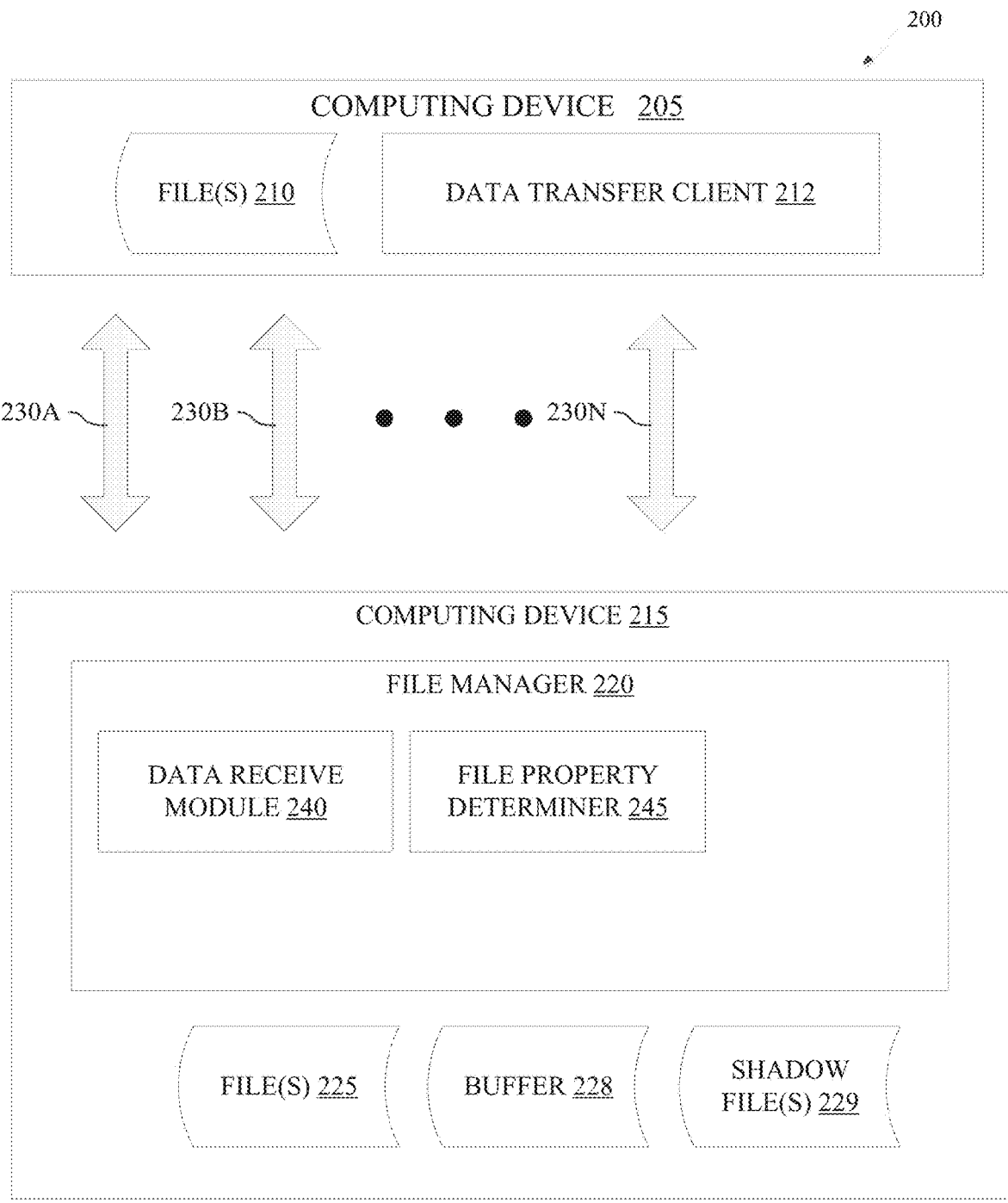
FIG. 2 is a block diagram of a system architecture that includes multiple connected computing devices, according to various embodiments of the present disclosure.

FIG. 2 is a block diagram of a system architecture 200 that includes multiple connected computing devices, according to various embodiments of the present disclosure. As illustrated, a computing device 205 is connected to another computing device 215. Computing device 205 and computing device 215 may each be one of an electronic book reader, portable digital assistant, mobile phone, smart phone, laptop computer, portable media player, tablet computer, camera, video camera, netbook, notebook, desktop computer, gaming console, digital video disc (DVD) player, media center, storage server, rackmount server, data transfer device (e.g., an Amazon® Snowball® device) or other type of computing device.

In one embodiment, computing device 205 is a storage server or host machine that includes one or more files 210 to be transferred to computing device 215. For example, computing device 205 may be a storage server that contains tens or hundreds of terabytes of files 210 that are to be moved to another storage server (e.g., to a cloud storage service). Alternatively, computing device 205 may be a server computing device (e.g., a rackmount server hosting an update service) that includes an update or patch to be downloaded to hundreds, thousands or millions devices (e.g., mobile phones, smart watches, devices having embedded systems, and so on), and computing device 215 may be one such device that receives the update or patch.

In one embodiment, computing device 215 may be a specialized computing device that is configured to copy huge amounts of data from computing device 205. After copying all of the files 210 from the computing device 205 into files 225 on computing device 215, computing device 215 may then be disconnected from computing device 205 and connected to another computing device, and may then copy all of the files 225 that were copied from computing device 205 onto the other computing device.

In one embodiment, computing device 215 is an internet of things (IoT) device such as embedded system of a device. An IoT device may be any device having an embedded system that includes network connectivity. An embedded system is a class of computing device that is embedded into another device as one component of the device. The device typically also includes other hardware, electrical and/or mechanical components that may interface with the embedded system. IoT devices generally have a limited amount of computational power, limited memory, and less predictable network connectivity than other types of computing devices.

Computing device 205 and computing device 215 may be connected via a network (e.g., a local area network (LAN), wide area network (WAN), wireless network, intranet, the Internet, or a combination thereof), a direct wired connection (e.g., via an Ethernet connection, a universal serial bus (USB) connection, a Firewire connection, a Lightning connector, a peripheral component interconnect express (PCIe) connection, a serial connection, a small computer system interface (SCSI) connection, a wireless connection (e.g., a Bluetooth® connection, a ZigBee® connection, etc.) or other type of physical connection. Computing device 205 and computing device 215 may also be connected via a wireless carrier network using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology. Additionally, in some embodiments there may be multiple physical connections between computing device 205 and computing device 215. For example, computing device 205 and computing device 215 may each include multiple network adapters, and the two computing devices may be physically connected via each of the network adapters.

In one embodiment, a single connection (e.g., connection 230A) is established between computing device 205 and computing device 215. In another embodiment, multiple connections 230A, 230B, through 230N are established between computing device 205 and computing device 215. For example, if computing device 215 is a specialized device designed to copy huge amounts of data (e.g., tens or hundreds of terabytes of data) from computing device 205, then multiple connections 230A-N may be established to increase a speed of data transfer.

In one embodiment, computing device 205 includes a data transfer client 212 that facilitates transfer of one or more files 210 from computing device 205 to computing device 215. In the above example, data transfer client 212 may detect the number of parallel connections that are possible, and may instantiate a separate thread for each such connection. Data transfer client 212 may also divide files into smaller portions that the separate threads send to computing device 215. Additionally, data transfer client 212 may reserve a last portion of the data for a file and send the last portion after all other portions of the data for the file have been sent.

Similarly, computing device 215 may include a file manager 220. File manager 220 may be platform (e.g. filesystem) independent, and may thus be used with any type of filesystem in embodiments. File manager 220 may include a data receive module 240 that also instantiates a thread for each possible connection. Each thread instantiated by data transfer client 212 may communicate with a corresponding thread instantiated by data receive module 240 to copy files 210 or portions of files 210 from computing device 205 to computing device 215. This enables many files 210 and/or portions of files 210 to be copied in parallel.

In one embodiment, file manager 220 is a sparse file manager that supports sparse files. Alternatively, file manager 220 may not support sparse files. In one embodiment, file manager 220 includes a data receive module 240 and a file property determiner 245.

When a file 210 is to be copied from computing device 205 to computing device 215, data receive module 240 may generate a new sparse file (e.g., file 225) to write the data of the file 210 to. Accordingly, data receive module 240 may generate a file 225 with a logical file size that does not (at least initially) correspond to the actual amount of storage space used by the file 225. In one embodiment, data receive module 240 pre-allocates storage space for newly created files 225. The amount of storage space that is pre-allocated may be based on the size of the file 210 that is being copied to computing device. In one embodiment, a standard file (e.g., a file other than a sparse file or pre-allocated file) is created, and a size of the standard file grows naturally as data is added to the file.

In order to enable one or more properties of a file 225 to be quickly determined based on a file size of the file, the sparse file or pre-allocated file that is initially generated for that file 225 may have a second size (logical size) that is different from a first size of the file 210 to be copied. A property such as file completeness, access rights, and so on may then be determined based on the file size, as described in greater detail below. Alternatively, if sparse files are not used, then space may be pre-allocated for a new file (e.g., a new file may be pre-allocated that is empty but that takes up the allocated amount of physical storage space). The amount of space that is pre-allocated may be different from the actual size of the file to be copied. A property such as file completeness, access rights, and so on may then be determined based on the file size, as described in greater detail below.

The file 210 may be a full file or a portion of a file. For example, a file may be broken up into multiple smaller files by data transfer client 212. Data receive module 240 may generate a separate sparse file or pre-allocated file for each of the smaller files, where each sparse file, pre-allocated file or other type of file has a slightly different size than the corresponding smaller file.

Once the file 225 is created, data transfer client 212 may begin sending portions of data of the corresponding file 210 to computing device 215 via the one or more connections 230A-N. If multiple connections are used, then it is possible for portions of data to be received out of order. For example, a first order in which the portions of data are received may be different from a second order, which is the order of placement of the portions of data in the file 225.

Accordingly, in one embodiment data transfer client 212 reserves a last portion of data of a file 210 that is being copied over to computing device 215. Once all of the other portions of data of the file 210 have been copied to the computing device and stored in a sparse file or pre-allocated file, then data transfer client 212 may send the last portion of data to computing device 215.

Upon receiving the last portion of data of the file 210, data receive module 240 may adjust a size of the sparse file or the pre-allocated file. For example, if the sparse file or pre-allocated file was allocated a second size that is smaller than a first size of the file 210, then data receive module 240 may increase the size of the sparse file or pre-allocated file to cause it to be equal to the first size. The last portion of data may then be stored in the file 225. The file is then a complete file. In another example, if the sparse file or pre-allocated file was allocated a second size that is larger than the first size of the file 210, then the data receive module 240 may decrease the size of the sparse file or pre-allocated file to again cause it to be equal to the first size. By reserving the last portion until all of the other portions of data have been stored in the file 225, it can be guaranteed that the file size will not be changed prematurely before the file is complete.

In one embodiment, the last portion of the data for a file 225 is sent in parallel with other portions of the data for the file. The last portion of the data may be stored in a buffer 228 in a memory of computing device 215. Once all of the other portions of data for the file 225 are received, then the last portion may be written to the file 225 from the buffer 228.

In some embodiments, if the second file size is larger than the first file size, then writing the last portion of the data to the file 225 may not trigger resizing. Accordingly, the last portion may be written to the file 225 before all other portions of the data are written to the file. Once all of the portions are written, then the file may be truncated from the second size to the first size.

In some embodiments, the files 210 contain dummy data at an end of the files 210. Dummy data is benign information that does not contain any useful data. Dummy data serves to add space or padding to the end of a file 210. In such embodiments, the file 225 that is created to copy the contents of a corresponding file 210 may have a same file size as the file 210. Once the data of the file 210 is completely copied to the file 225, then the dummy data at the end of the file 225 may be deleted, causing the file 225 to have a second size that is smaller than the first size. The second different size may serve as an indication that the file 225 is complete or has another state or property.

In one embodiment, data receive module 240 generates a shadow file 229 for each file 225. A shadow file 229 may be metadata of the file 225 that includes a known file size of the file (e.g., the first file size of the corresponding file 210). In one embodiment, the shadow file 229 is a sparse file that is empty of data but that has a logical file size that is equal to the file size of the file 210.

At any time file property determiner 245 may perform a simple LS command (in Unix) or similar command to list the files in a directory and the sizes of those files, or to list the file size of a particular file. The size that is returned may be compared by file property determiner 245 against a size criterion. If the current size of a file satisfies a size criterion, then the file may be determined to have a particular property. For example, the file may be determined to be a complete file, a file with particular permissions, a file that is designated for deletion, a file that is to be archived or has been archived, a file that has passed an integrity check, a file that has been optimized, and so on. If the current size of the file fails to satisfy the size criterion, then it may be determined that the file lacks the particular property or has a different property. For example, the file can be determined to be an incomplete file, a file that lacks particular permissions, a file that is not designated for deletion, and so on.

In one embodiment, the size criterion is a matching criterion. File property determiner 245 may compare the current size of the file (e.g., that was reported using the LS command) to a size of a corresponding shadow file, a corresponding entry in a shadow file 229, or an otherwise known size of the file. If the current size of the file 225 matches the size of the corresponding shadow file 229, the shadow file entry, or an otherwise known file size, then the size criterion is satisfied in one embodiment. If the current size of the file 225 fails to match the size of the corresponding shadow file 229, shadow file entry, or otherwise known file size, then the size criterion is not satisfied in one embodiment.

In one embodiment, all valid files on a filesystem of computing device (e.g., all valid files managed by file manager 220) have an even number of bytes (or a prime number of bytes or one of a plurality of known specific file sizes). Sparse files, pre-allocated files and/or other files may be generated that have an odd number of bytes (or that eventually have an odd number of bytes once they are complete). Alternatively, the sparse files, pre-allocated files and/or other files may have a file size that does not include a prime number of bytes, or a file size that is not one of the plurality of known specific file sizes. When the last portion of data of a file is stored in a sparse file or pre-allocated file and the file size is adjusted to equal the amount of space actually used by the file, then the file has an even number of bytes (or a prime number of bytes or number of bytes that causes the file to have one of the plurality of known specific file sizes). Alternatively, after an operation is performed on a file or an entirety of the file is stored, then the file may be adjusted by deleting a last portion of the file that contains dummy data. Deleting the last portion of the file may cause the file to switch from an odd value to an even value (or a prime number of bytes or number of bytes that causes the file to have one of the plurality of known specific file sizes). Alternatively, the file may start with an odd value (or non-prime value, or known predefined value) and no dummy data. After the operation is complete, then dummy data may be added to the file to cause it to have an even number of bytes (or a prime number of bytes or number of bytes that causes the file to have one of the plurality of known specific file sizes). Examples of operations that me be performed on the file 225 include integrity checks (e.g., computing a checksum), optimizations (e.g., a dex optimization), and so on.

Accordingly, the size criterion may be a criterion that a file have an even number of bytes. Alternatively, the size criterion may be a criterion that a file has a prime number of bytes or that a file have a size that is equal to a small number of predetermined file sizes. After determining the size of a file (e.g., using the LS command), file property determiner 245 may determine whether the file has an odd number of bytes or an even number of bytes (or satisfies another file size criterion). If the file 225 has an odd number of bytes (or a prime number of bytes or a file size other than a predetermined number of bytes), then the file fails to satisfy the size criterion. If the file 225 has an even number of bytes (or a prime number of bytes or a file size with a predetermined number of bytes), then the file satisfies the size criterion. Notably, the use of shadow files 229 may be omitted in this embodiment since a determination as to whether a file 225 satisfies a size criterion can be made without checking a shadow file 229.

In the context of IoT devices and mobile devices, such devices may periodically receive updates and/or patches. IoT device manufacturers may then perform integrity checks on the IoT devices to verify whether an update or patch was successful. In one embodiment, the techniques discussed in embodiments herein are performed to determine whether an update or patch has completed. For example, an IoT device may scan its files to determine file sizes of those files. This scan may be performed automatically by the IoT device or in response to an instruction from the IoT device manufacturer to scan the files. These file sizes of the files may be reported back to the IoT device manufacturer. The IoT device manufacturer may include information that indicates the sizes that each of the files should have. The IoT device manufacturer may then determine whether any of the files on IoT devices are incomplete based on their file size. In another example, the IoT device may determine which files have completed downloading based on whether those files are even or odd. The IoT device may then report to the IoT device manufacturer whether the update or patch is complete. For example, if an update or patch is interrupted, the IoT device may determine which files are complete and then request resumption of downloads for the incomplete files or request new downloads of the incomplete files. If the update or patch is completed, then the IoT device or IoT device manufacturer may perform an integrity check. If the integrity check fails, then the IoT device may discard the entire update and start the update process over. The above may also apply to mobile devices.

In one embodiment, an integrity check is performed on a file on a mobile device or IoT device after an update or patch has been downloaded to the device. If the integrity check passes, then dummy data may be added to or removed from the file to cause the file to have an even number of bytes.

In one embodiment, the files are sized such that they will not ordinarily end on block boundaries (e.g., on a typical 4 kB block boundary). For example, additional space characters and/or carriage returns may be added to log files to ensure that the log files do not end on a 4 kB block boundary. A write of multiple log entries may be performed. If the write is split, then it will likely be split on a 4 kB block boundary. Accordingly, it can be determined whether a file is complete based on whether the file ends on a 4 kB block boundary. Files ending on a 4 kB block boundary may be identified as incomplete.

In the use case of mobile devices (e.g., mobile phones), updates generally include multiple system files. When the operating system for the mobile device (e.g., the Android® operating system) boots up, it commonly performs a dex optimization operation (e.g., an operation called ReDex), which optimizes .dex files. The dex optimization converts system files into expanded files having an optimized format. In one embodiment, after a file is optimized, dummy data is added or removed from the file to cause the file to have an even number of bytes. If a reboot occurs during dex optimization, the mobile device generally starts the dex optimization process over. However, in one embodiment after a reboot file manager 220 determines which files have already been optimized based on whether those files are even or odd. Un-optimized files may have an odd number of bytes.

FIGS. 3-8 are flow diagrams showing various methods for storing files in a manner that enables a property of those files to be quickly verified based on file size as well as methods for determining properties of files based on file size. For each of these methods, file size acts as a flag that indicates a property such as file completeness. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a file manager, such as file manager 220 of computing device 215 in FIG. 2. The various methods described with reference to FIGS. 3-8 are platform independent, and may be performed using any type of filesystem. In some embodiments, the filesystems should support sparse files.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3:
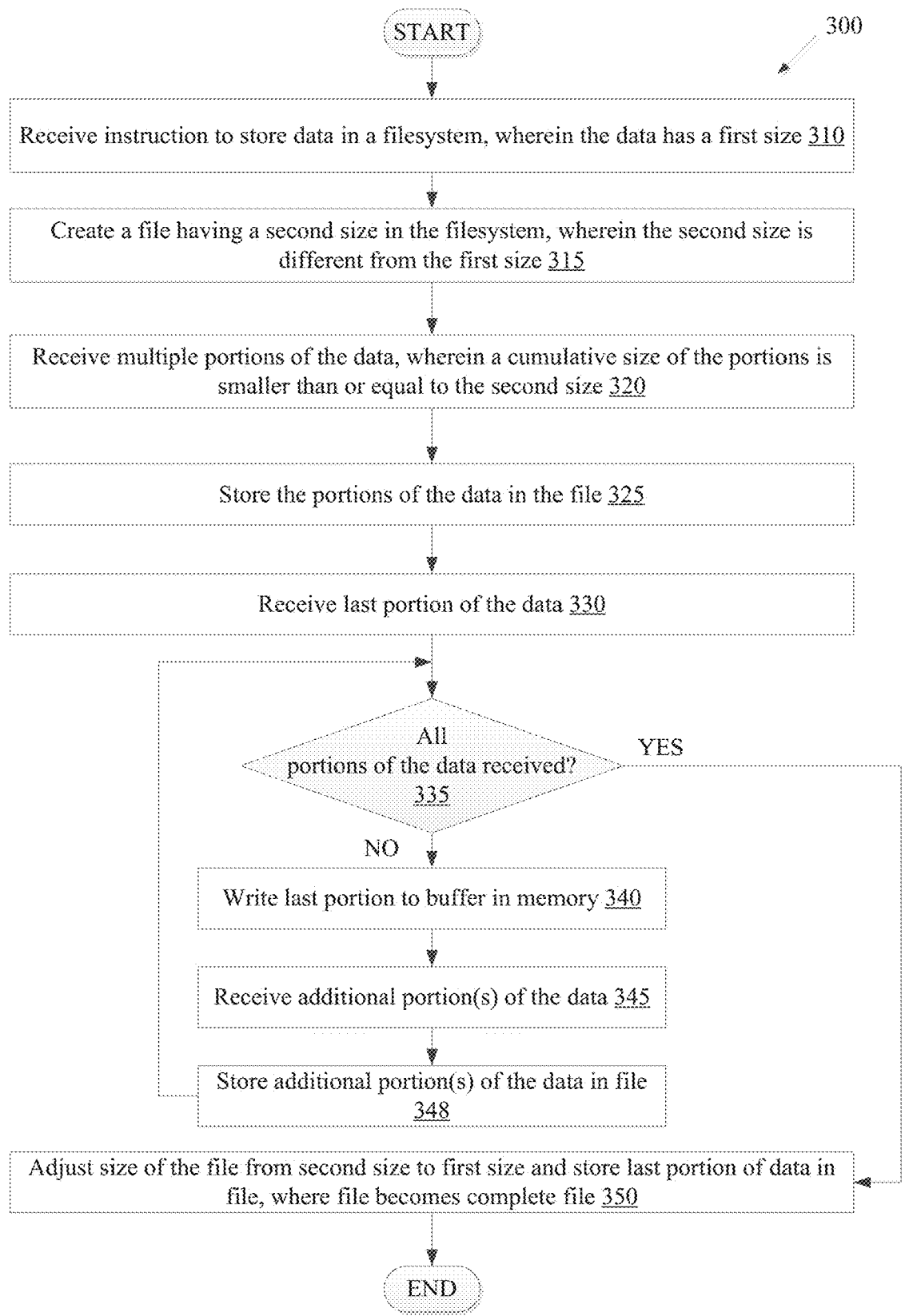
FIG. 3 depicts a flowchart illustrating an embodiment for a method of storing a file in a manner that enables a property of the file to be quickly verified based on file size.

FIG. 3 depicts a flowchart illustrating an embodiment for a method 300 of storing a file in a manner that enables a property of the file to be quickly verified based on file size. At block 310 of method 300, processing logic receives an instruction to store data in a filesystem. The data may be a file that has a first size. The instruction may be received from an application running on a computing device that includes the processing logic. Alternatively, the instruction may be received from a remote device (e.g., from a second computing device connected to the computing device that includes the processing logic). The data to be stored may be a file that is stored on the second computing device. The data may have a first size.

At block 315, processing logic creates a file having a second size in a filesystem of the computing device. Notably, the second size is different from the first size. For example, the second size may be one or a few bytes larger or smaller than the first size (e.g., 1-10 bytes larger or smaller). In one embodiment, the file that is created is a sparse file. Alternatively, the file that is created may be a pre-allocated file (or pre-allocated space for a file).

At block 320, multiple portions of the data are received (e.g., from the second computing device). A cumulative size of the multiple portions may be less than or equal to the second size of the file. At block 325, processing logic stores the received portions of data in the file. In one embodiment, the portions of the data are received out of order. For example, a second portion of the data that is for byte offsets 26-32 may be received before a first portion of the data that is for bye offsets 8-26. Accordingly, the order in which the portions of the data are received may not correspond to the order in which the portions of the data are placed in the file.

At block 330, processing logic receives a last portion of the data. In one embodiment, a header associated with the last portion identifies the last portion as containing the one or more bytes at the end of the file. Accordingly, processing logic may identify a received portion as the last portion based on the header. The last portion is used in embodiments as a marker or flag that indicates whether the file has a particular property (e.g., whether the file is a complete file). In one embodiment, the last portion of the data is an extra one or more bytes added to the data that indicate, for example, access rights, deletion status, completeness, and so on. For example, the last portion of the data may be padding or a dummy byte. The dummy data may be added to or removed from the file to indicate a property of absence of a property. Alternatively, the last portion of the data may be a last one or a few real bytes of the body of the file that is being copied from the second computing device into the file on the computing device.

In one embodiment, the last portion of the data is received after a remainder of the portions of the data are received. The sender of the data (e.g., the second computing device) may reserve the last portion of data until the rest of the portions of data for the file are received. Receipt by the processing logic of the last portion of data may trigger a change in size of the file. Accordingly, by holding off on sending the last portion of the data, the sender of the data may ensure that the file size for the file into which the data is written conveys information on one or more parameters of the file other than file size (e.g., file completeness).

In another embodiment, the last portion of the data for a file may be received before all of the remaining portions of the data for the file have been received. In such an embodiment, processing logic may not store the last portion of the data in the file until all of the other portions of the data have been stored to the file. This may ensure that the file will not change size until the file is a complete file.

At block 335, processing logic determines whether all portions of the data have been received. If all portions of the data have been received, the method proceeds to bock 350. If one or more portions of the data have not yet been received, the method continues to block 340. At block 340, processing logic writes the last portion to a buffer in a memory of the computing device. The last portion may be maintained in the buffer until a remainder of the portions are received. At block 345, processing logic receives one or more additional portions of the data. At block 348, processing logic stores the one or more additional portions of the data in the file. The method then returns to block 335 and processing logic again checks whether all of the portions of the data have been received.

In one embodiment, the second file size of the file is greater than the first file size. In such an embodiment, the last portion of the file may be stored in the file when it is received, whether or not all of the portions of the file have been received. Then, once all of the remaining portions of the data have been stored in the file, the file size of the file may be truncated. In such an embodiment, storage of the last portion would not act as a trigger for modifying the file size. Instead, processing logic may receive a notice from a sender once all of the portions of data have been successfully sent. The notice may act as a trigger to modify the file size. Alternatively, processing logic may track the portions of data that have been received, and may determine when all portions of the data have been received. Once processing logic determines that all of the portions of data have been received, processing logic may truncate the size of the file.

At block 350, processing logic adjusts a size of the file from the second size to the first size and stores the last portion of data in the file. This may cause the file to become a complete file. The method may then end. The file size may be adjusted prior to storing the data in the file, or may be adjusted as a result of storing the data in the file. For example, if the file is too small to accommodate the last portion of the data, then the file size may be increased from the second size to the first size. Storage devices commonly store data using predefined block sizes, which may be 4 kB blocks, 8 kB blocks, 16 kB blocks, or another block size. In some instances, expanding the file size may cause the file to extend into an additional block. In such instances, an additional block may be allocated for the file when the file is expanded. If the file is larger than the first size, then the file size may be decreased from the second size to the first size. For sparse files, standard sparse file sizing mechanisms may be used to adjust the file size.

In some embodiments, other operations may be performed in response to the file becoming a complete file. For example, in one embodiment permissions of the file may be modified when the file becomes a complete file. After an operation is performed on a file, a small number of bits (e.g., a byte) of additional dummy data may be added to an end of the file or removed from the end of the file. These few bits may indicate the permissions or other metadata associated with the file and/or may indicate other properties. Adding or removing dummy data to/from the file may cause the file to have a third file size, which may be different from the first and second file sizes. In another example, the file may be tagged for archiving when the file becomes a complete file. In another example, the file may be tagged for deletion until the file becomes a complete file.

In one embodiment, once the file is identified as complete processing logic generates a completion notice and/or a message that includes such a completion notice. The completion notice or message may be sent to the sender of the data, for example. Alternatively, or additionally, the completion notice or message may be sent to an additional device.

In one embodiment, the data that is stored in the file constitutes a segment of a large file on a second computing device that is sending the data. The large file may have been segmented into multiple segments by the sender to enable file copy progress to be more easily tracked. For example, the data may constitute a file that is Megabytes (MB), Gigabytes (GB) or Terabytes (TB) in size. The file may be broken up into the multiple segments, where the data of each segment is written to a different file by processing logic. Method 300 may be performed separately for each of the multiple segments. Accordingly, file download or upload progress may be tracked based on the file sizes of the files that constitute the segments of a larger file. For example, a 1 TB file may be separated into ten 100 GB segments, and each of the 100 GB segments may be copied to a separate file in a filesystem. A simple LS operation may be performed to identify the sizes of each of the separate files. Based on those sizes, processing logic may determine which of the segments have been completely copied, and which have not yet been completely copied.

Alternatively, or additionally, an additional file may be generated for tracking completeness. Once all of the portions of data have been written to the file, then the additional file may be deleted. Accordingly, presence of the additional (side) file that is associated with a particular file may indicate that the particular file is an incomplete file.

Figure 4:
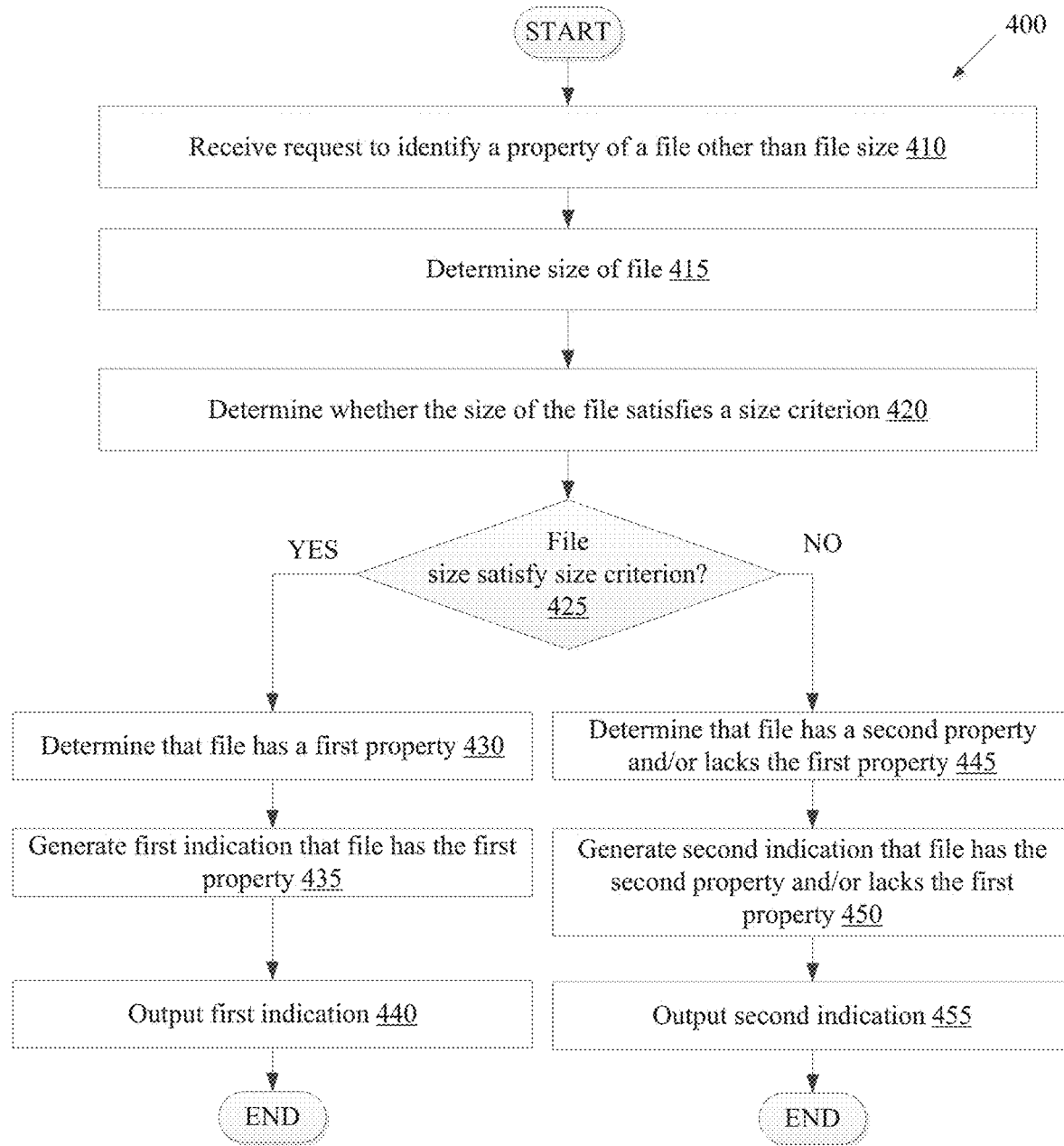
FIG. 4 depicts a flowchart illustrating an embodiment for a method of determining a property of a file based on a file size of the file.

FIG. 4 depicts a flowchart illustrating an embodiment for a method 400 of determining a property of a file based on a file size of the file. At block 410 of method 400, processing logic receives a request to identify a property of a file other than file size. For example, processing logic may receive a request to determine whether a particular file is a complete file or to identify which files in a directory are complete and which are incomplete. Other properties that may be verified based on file size are whether a file is valid, whether a file has been optimized, and so on. Alternatively, processing logic may determine to check on properties of files without receiving a request to do so. For example, on recovery from a crash or after being rebooted, processing logic may perform a check on a particular property or properties of all files in one or more directories. Such a check may be performed, for example, by using an LS command in Unix or Linux. Alternatively, or additionally, processing logic may use a tool to track when file sizes change for any files in a directory. Examples of such a tool include inotify and dnotify in Linux. Alternatively, processing logic may determine when a file size changes without the use of such a tool. The change in file size may trigger the processing logic to perform a check on a file property and/or to generate a notice regarding a file property (e.g., such as file completeness).

At block 415, processing logic determines a current size of a file. Processing logic may detect the current size of the file using a command such as LS in Unix or Linux. At block 420, processing logic determines whether a size of the file satisfies a size criterion. At block 425, if the file size satisfies a size criterion, the method continues to block 445. If the file size fails to satisfy the size criterion, the method continues to block 430.

In one embodiment, the size criterion specifies that files should have an even number of bytes. Accordingly, if the file size for the file has an odd number of bytes, then the file may not satisfy the size criterion. If the file size has an even number of bytes, then the file may satisfy the size criterion. In one embodiment, the size criterion specifies that the file should have a file size that is equal to a file size that is associated with the file. The associated file size may be a file size that an original or source file that the file is a copy of has. In one embodiment, the associated file sizes of multiple files may be included as entries in a file or data structure. The determined file size may be compared to the associated file size that the file should have. If there is an inconsistency between these file sizes, then processing logic may determine that the file is not complete and/or that the file has or lacks another property. In one embodiment, the size criterion specifies that files should file sizes that are prime numbers. If a file does not have a prime number of bytes, then the file would fail this size criterion. In one embodiment, the size criterion specifies that files should have file sizes that are one of a finite number of typical or predetermined file sizes. If a file has a file size that does not correspond to one of these typical or predetermined file sizes, then the file will fail to satisfy the size criterion.

In one embodiment, a filesystem includes a shadow file associated with the file. The shadow file may be, for example, a sparse file that has the associated size that the file should have if it is a complete file. However, the associated sparse file may be an empty file, and may use approximately zero space in storage. In such an embodiment, a command such as an LS command may return the current file size of a file and a file size of an associated file (e.g., an associated shadow file). These file sizes may be compared to determine whether the file is a complete file. If the file sizes match, then the file may be identified as a complete file. If the file sizes fail to match, then the file may be identified as an incomplete file. In one embodiment, a shadow file is deleted at some point after a file that the shadow file is associated with is identified as a complete file. Accordingly, in some embodiments if a shadow file of a file does not exist in a directory then it may be determined that the file is a complete file.

In one embodiment, the shadow file has a name that includes the last hexadecimal digit of the file size that the file should have. If the last hexadecimal digit of the file does not match the last hexadecimal digit in the shadow file name, then the file may be identified as an incomplete file. If the last hexadecimal digit of the file does match the last hexadecimal digit in the shadow file name, then the file may be identified as a complete file.

In one embodiment, processing logic may include a list of acceptable complete file sizes. Most files when complete will have a size that is equal to one of the file sizes in the list. Accordingly, the file size of a file may be checked, and may be compared to the list to determine if that file is a complete file. If the file has a file size that is not on the list, then the file may be identified as an incomplete file. For files that should have a file size that is not in the list, then a shadow file may be created for that file as set forth above. Accordingly, if a shadow file exists for a file, then the file may be checked for completeness using the shadow file. If no shadow file exists for a file, then the file may be checked for completeness using the list of known file sizes.

In one embodiment, such as where a tool such as inotify or dnotify is used, the tool may generate a notification of a file size change when the file size change occurs. Initially generated sparse files or pre-allocated files may be intentionally sized incorrectly. Such a file may be resized when the last portion of data for the file is stored in the file. Accordingly, the notification of size change for a file in such an embodiment may constitute a notice that a file is now a complete file. In such an embodiment, the request to identify the property of the file at block 410 may correspond to the initial setting up of the inotify or dnotify tool. The operations of blocks 415, 420 and 425 may all be achieved by the inotify or dnotify tool identifying that a file has changed size.

At block 430, processing logic determines that a file has a first property. For example, processing logic may determine that a file is a complete file, that the file does or does not include particular access rights, that the file is or is not marked for deletion or for archival, that an optimization operation has or has not been performed on the file, that the file has or has not been verified, and so on. At block 435, processing logic generates a first indication that the file has the first property. At block 440, processing logic outputs the first indication. The first indication may be output to a log, may be sent to a computing device, and so on.

At block 445, processing logic determines that a file has a second property and/or that the file lacks the first property. For example, processing logic may determine that a file is an incomplete file, that the file does or does not include particular access rights, that the file is or is not marked for deletion or archiving, and so on. At block 450, processing logic generates a second indication that the file has the second property and/or that the file lacks the first property. At block 455, processing logic outputs the second indication. The second indication may be output to a log, may be sent to a computing device, and so on.

Figure 5:
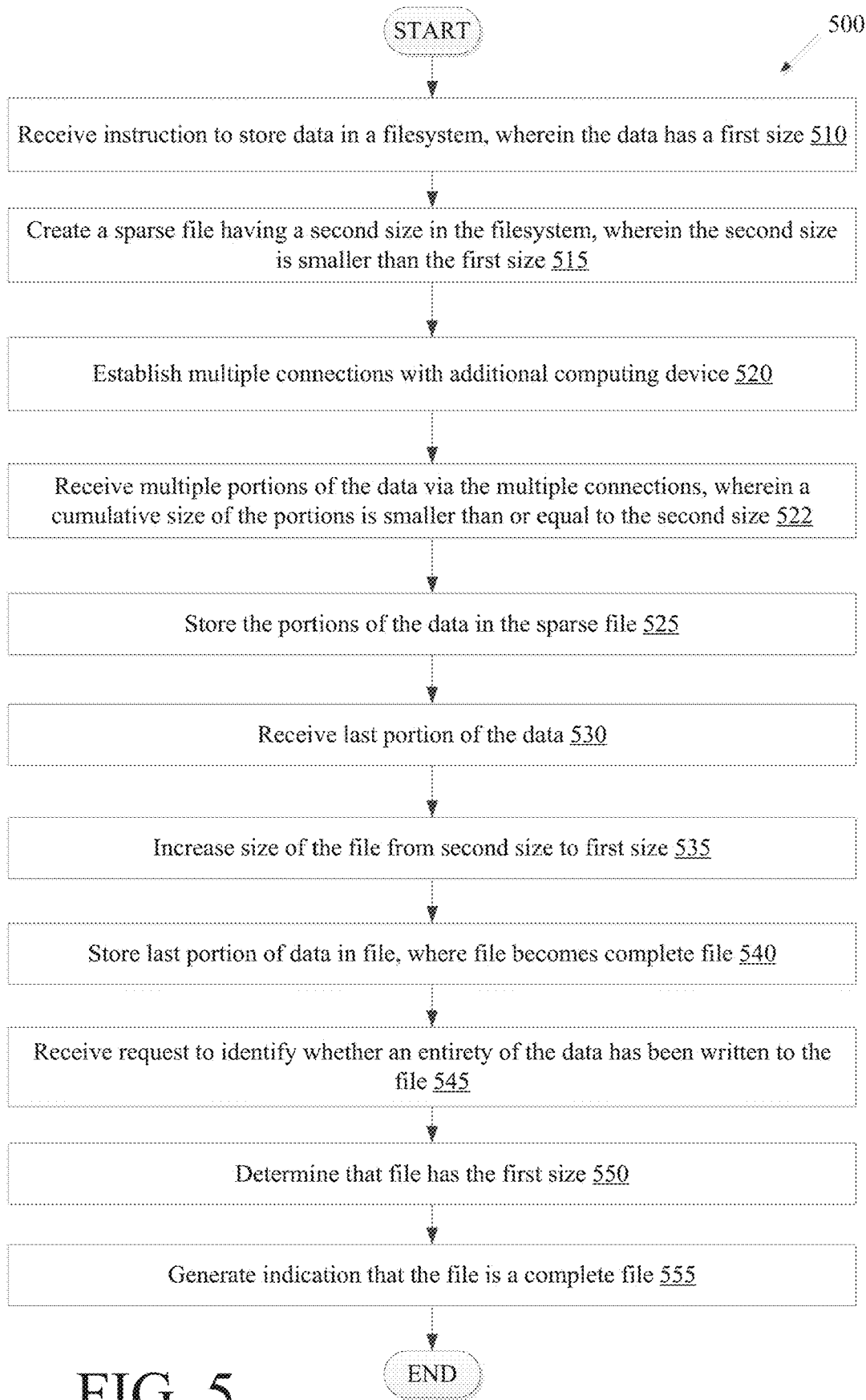
FIG. 5 depicts a flowchart illustrating an embodiment for a method of storing a file and determining that the file is complete based on a file size of the file.

FIG. 5 depicts a flowchart illustrating an embodiment for a method 500 of storing a file and determining that the file is complete based on a file size of the file. At block 510 of method 500, processing logic receives an instruction to store data (e.g., a file) in a filesystem, where the data has a first file size. At block 515, processing logic creates a sparse file having a second size in the filesystem. The second size may be smaller than the first size. The data for the file will be stored in the sparse file.

At block 520, processing logic establishes multiple connections with an additional computing device that will be sending the data. In one embodiment, processing logic instantiates multiple threads, and the additional computing device similarly instantiates multiple threads. Each of the threads on a local computing device on which processing logic executes may establish a connection with a corresponding thread on the additional computing device. Each connection may use a different port of the local computing device, for example.

At block 522, processing logic receives multiple portions of the data via the multiple connections. Notably, the different portions of the data may be received out of order. A cumulative size of the portions may be smaller than or equal to the second size. A last or final portion of the data may be reserved by the additional computing device, and may not be sent in parallel with the other portions at block 522 in some embodiments.

At block 525, processing logic stores the received portions of the data in the sparse file. At block 530, processing logic receives the last portion of the data. The last portion may be sent by the additional computing device once all of the other portions of the data have been received by processing logic. At block 535, processing logic increases a size of the sparse file from the second size to the first size. At block 540, processing logic stores the last portion of the data in the sparse file. At this point the file is a complete file.

At block 545, processing logic receives a request to identify whether an entirety of the data has been written to the file. At block 550, processing logic determines that the file has the first size (e.g., via an LS or similar command). At block 555, processing logic generates an indication that the file is a complete file. The indication may be recorded in a log file, may be sent to another process, may be sent to the additional device, may be sent to some other device, and so on.

In one embodiment, the above described operations of blocks 545-550 are not performed. Instead, at block 545 processing logic detects that the file size has changed. In one embodiment, a tool such as dnotify or inotify is used to identify the change in file size. Block 550 may be skipped, and at block 555 processing logic may generate an indication that the file is a complete file. The change in file size may be used as an indication that the file is a complete file. For example, the file size may be applied to a size criterion that is satisfied if the file has changed size. The fact that the file has changed size may indicate that the file is a complete file. The identity of the complete file may then be written to a log of complete files, or may otherwise be reported out.

Figure 6:
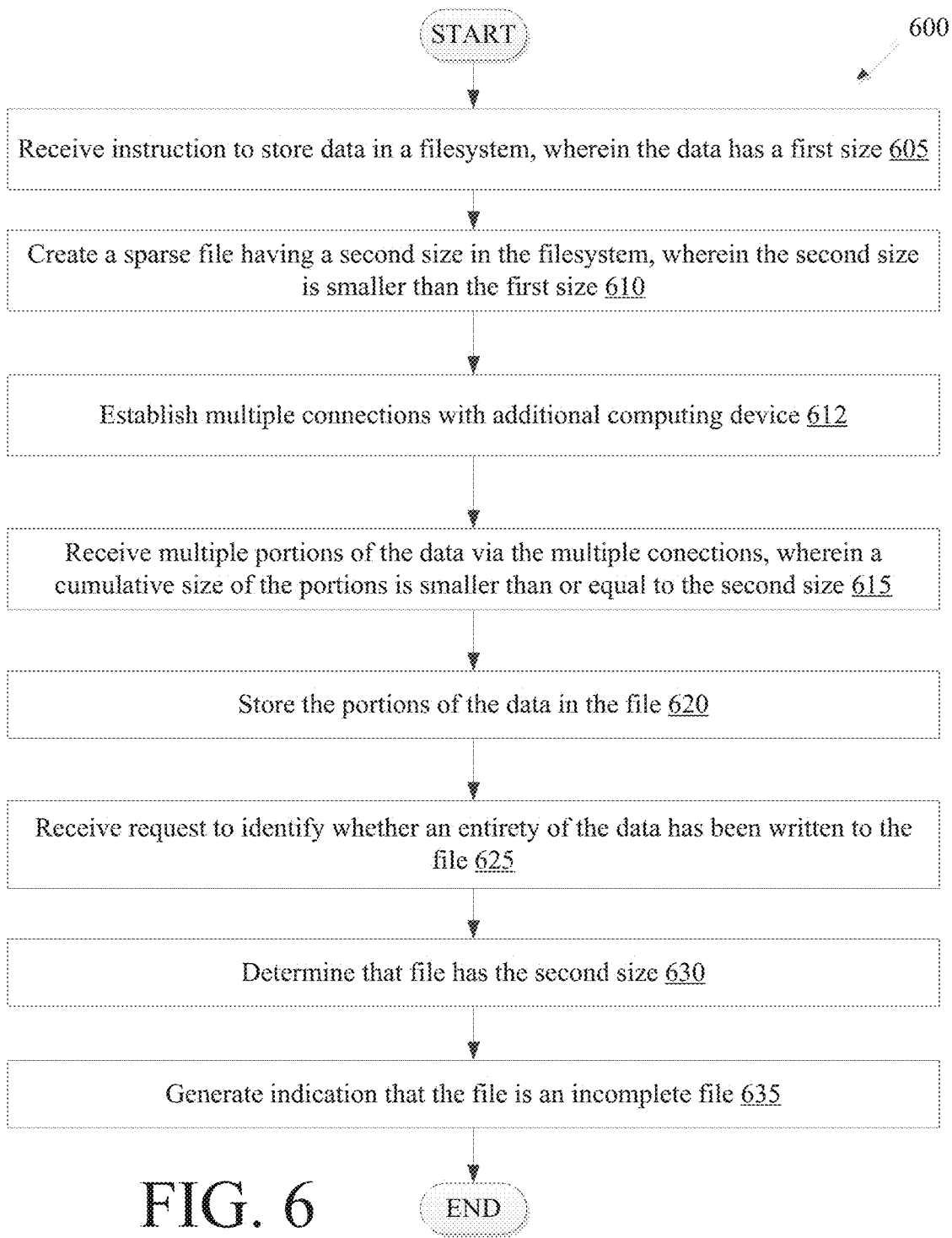
FIG. 6 depicts a flowchart illustrating an embodiment for a method of storing a file and determining that the file is incomplete based on a file size of the file.

FIG. 6 depicts a flowchart illustrating an embodiment for a method 600 of storing a file and determining that the file is incomplete based on a file size of the file. At block 605 of method 600, processing logic receives an instruction to store data (e.g., a file) in a filesystem (or otherwise receives an indication of data to store in the filesystem), where the data has a first file size. At block 610, processing logic creates a sparse file having a second size in the filesystem. The second size may be smaller than the first size. The data for the file will be stored in the sparse file.

At block 612, processing logic establishes multiple connections with an additional computing device that will be sending the data. At block 615, processing logic receives multiple portions of the data via the multiple connections. A cumulative size of the portions may be smaller than or equal to the second size. A last or final portion of the data may be reserved by the additional computing device, and may not be sent in parallel with the other portions at block 615 in some embodiments.

At block 620, processing logic stores the received portions of the data in the sparse file. At block 625, processing logic receives a request to identify whether an entirety of the data has been written to the file. At block 630, processing logic determines that the file has the second size (e.g., via an LS or similar command). Processing logic may compare the second size to the first size, which may be included as metadata in the file, may be included in a shadow file associated with the file, or may be included in an additional file or data structure. Processing logic may determine that the second size differs from the first size. The discrepancy in size between the first size and the second size may cause the size of the file to fail to satisfy a size criterion. Alternatively, processing logic may determine that the second size has an odd number of bytes. The odd number of bytes may cause the second size to fail to satisfy a size criterion.

At block 635, processing logic generates an indication that the file is an incomplete file. The indication may be recorded in a log file, may be sent to another process, may be sent to the additional device, may be sent to some other device, and so on.

Figure 7:
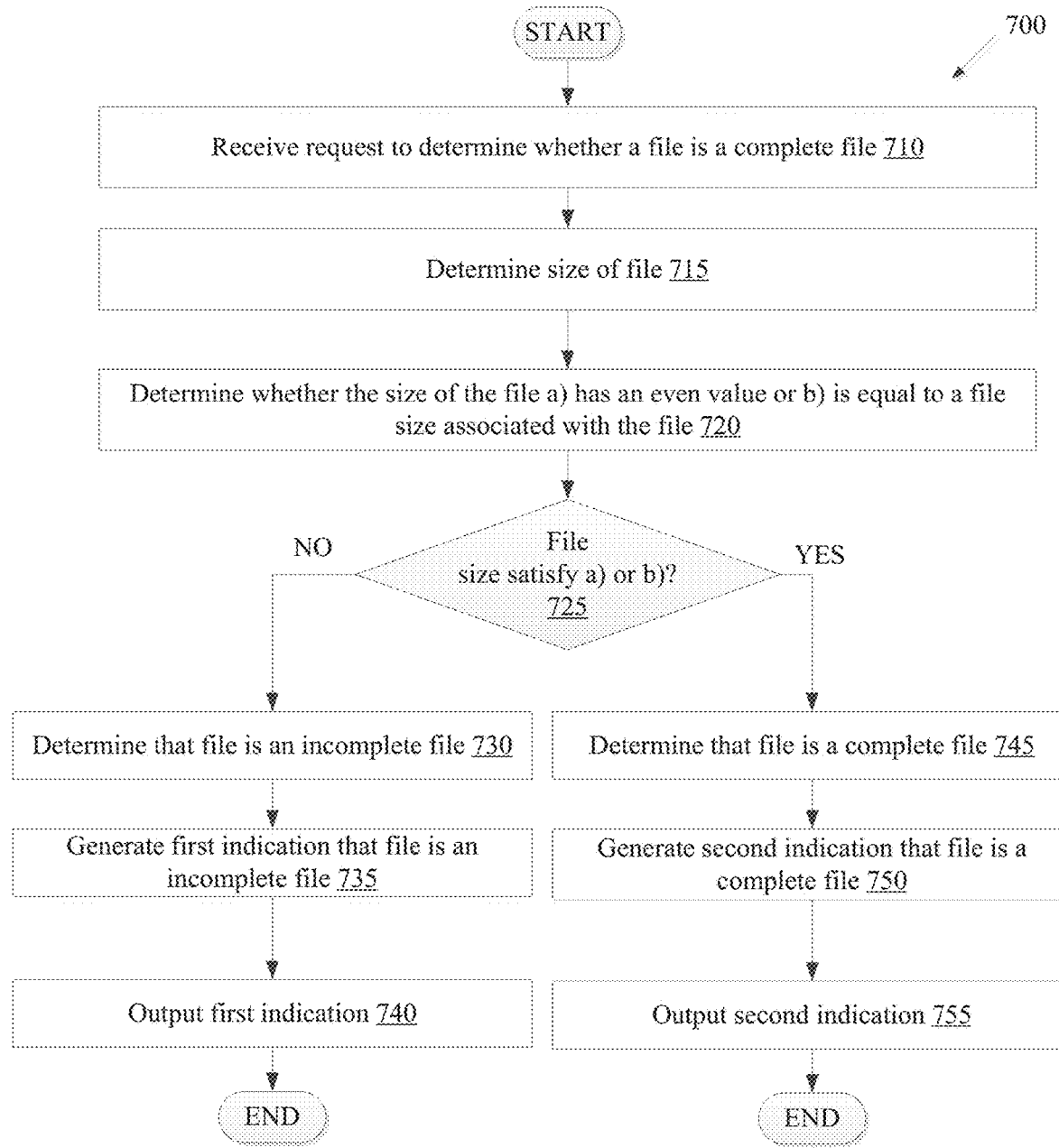
FIG. 7 depicts a flowchart illustrating another embodiment for a method of determining a property of a file based on a file size of the file.

FIG. 7 depicts a flowchart illustrating another embodiment for a method 700 of determining a property of a file based on a file size of the file. At block 710 of method 700, processing logic receives a request to determine whether a file is a complete file (or to determine which files in a set of files are complete files). At block 715, processing logic determines a size of the file (or the sizes of multiple files), such as by using an LS command or similar command. At block 720, processing logic determines whether the size of the file satisfies a size criterion. This may include a) determining whether the size of the file has an even value or b) determining whether the size of the file is equal to a size associated with the file, where the size associated with the file is a size that the file should have if the file is a complete file.

If at block 725 it is determined that the file size has an even number of bytes or has a size that is equal to the file size associated with the file, the method proceeds to block 745. If at block 725 it is determined that the file size has an odd number of bytes or has a size that is differs from the file size associated with the file, then the method proceeds to block 730.

At block 730, processing logic determines that the file is an incomplete file. At block 735, processing logic generates a first indication that the file is an incomplete file. At block 740, processing logic outputs the first indication.

At block 745, processing logic determines that the file is a complete file. At block 750, processing logic generates a second indication that the file is a complete file. At block 755, processing logic outputs the second indication.

Figure 8:
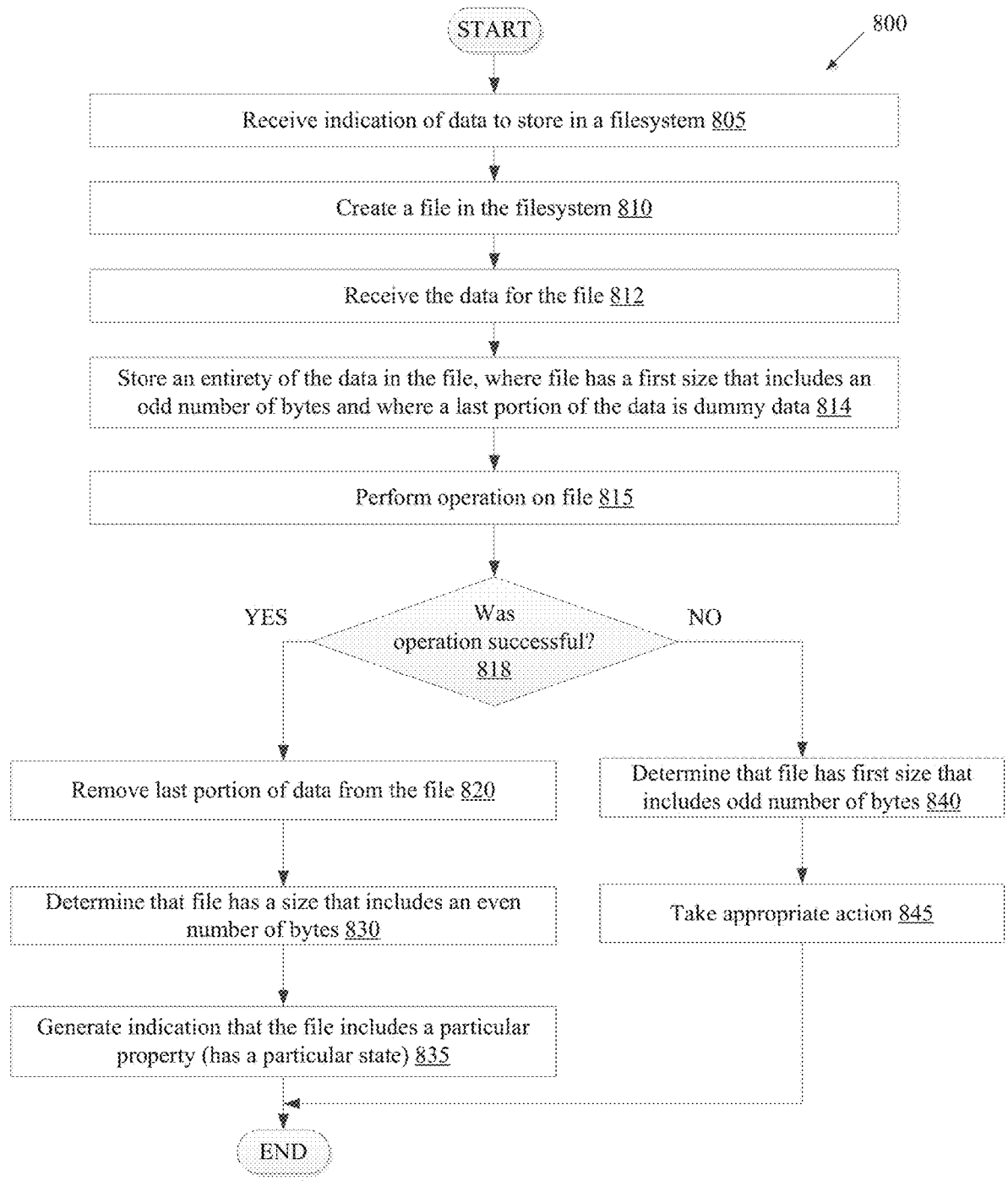
FIG. 8 depicts a flowchart illustrating one embodiment for a method of using dummy data to adjust a file size of a file and detecting a property of the file based on the file size.

FIG. 8 depicts a flowchart illustrating one embodiment for a method 800 of using dummy data to adjust a file size of a file and detecting a property of the file based on the file size. At block 805 of method 800, processing logic receives an instruction to store data in a filesystem, or otherwise receives an indication of data to store in the filesystem. At block 810, processing logic creates a file in the filesystem. The file may be a standard file, a sparse file, or a pre-allocated file, for example. At block 812, processing logic receives the data for the file. At block 814, processing logic stores an entirety of the data in the file. The file may have a first size that includes an odd number of bytes, a number of bytes that is not a prime number, or a number of bytes that is not equal to a file size in a list of predetermined file sizes. A last portion of the data (and of the file) is dummy data.

In one embodiment, the file is a standard file that starts at a second size that is smaller than a first size of the data to be stored. As portions of the file are received, the file size may grow until the all of the portions of data have been received and the file has the first file size. Alternatively, the file may be a sparse file or pre-allocated file, and may be allocated with a second size that is less than or greater to the first size. Once an entirety of the data is received and stored in the file, the file size may be adjusted to be equal to the first size. The file may be checked to determine whether the file is a complete file using any of the techniques described herein above. In one embodiment, a first file size criterion is used to determine whether the file is a complete file.

At block 815, processing logic performs an operation on the file. For example, processing logic may perform a checksum of the file, may perform another type of integrity check on the file, may generate a cryptographic signature for the file, may perform optimization of the file, and so on.

At block 818, processing logic determines whether the operation was performed successfully. If the operation was performed successfully, then the method proceeds to block 820. If the operation was not performed successfully, then the method proceeds to block 840.

At block 820, after the operation is successfully performed processing logic removes the last portion of the file (the dummy data) from the file. This may cause the file to have a third size that may be different from the first size and the second size. Additionally, this may cause the file to have an even number of bytes.

At block 830, processing logic determines that the file has a third size that includes an even number of bytes (or satisfies a second size criterion). The even number of bytes may indicate that the operation has been successfully completed on the file. The second file size criterion that is used to determine if the operation was successfully performed on the file may differ from the first size criterion. At block 835, processing logic generates an indication that the file includes a particular property (has a particular state). For example, the indication may show that the operation has been successfully completed on the file.

In an alternative embodiment, the file may start as an odd file that lacks dummy data. Then at block 820 after the operation has been successfully performed on the file, dummy data may be added to the file to cause the file to have an even number of bytes. In a similar manner as described above, a property of the file may be determined based on whether the file has an even number of bytes or an odd number of bytes.

At block 840, processing logic determines that the file has the first size that includes an odd number of bytes (or fails to satisfy the second file size criterion). This indicates that the operation was successful, and so processing logic may determine that the operation was unsuccessful based on the determination that the file has the first size. At block 845, processing logic takes appropriate action in view of the unsuccessful operation. The appropriate action may depend on the type of operation that was attempted. Some examples of appropriate actions that may be taken include deleting the file, retrying the operation, rebuilding the file, and so on. For example, if the operation was interrupted during the operation, then the operation may be attempted again. If the operation included validating the file, and the file failed validation, then the file may be deleted. If the operation was an audit operation, for example, then the failed audit operation may be performed a second time. In some instances many files may be downloaded, and those files may be checked for corruption at block 815. Those files that are corrupted may be deleted and downloaded again. If the operation is attempted again and is successful the second (or other) time, then the method may return to block 818.

Embodiments of method 800 have been described with reference to determining whether an operation has been performed based on a file having an even or odd number of bytes. However, other file size criteria may also be used instead of or in addition to whether a file size is even or odd. For example, files (with or without dummy data) may be sized to have a prime number of bytes. Therefore, a determination as to whether an operation has been performed may be made based on whether a file has a prime number of bytes. Alternatively, files may be sized such that there is a subset of sizes that are known to be valid. Processing logic may determine that an operation has been performed on a file if the file has a file size that corresponds to one of the file sizes in the subset of file sizes known to be valid.

Figure 9:
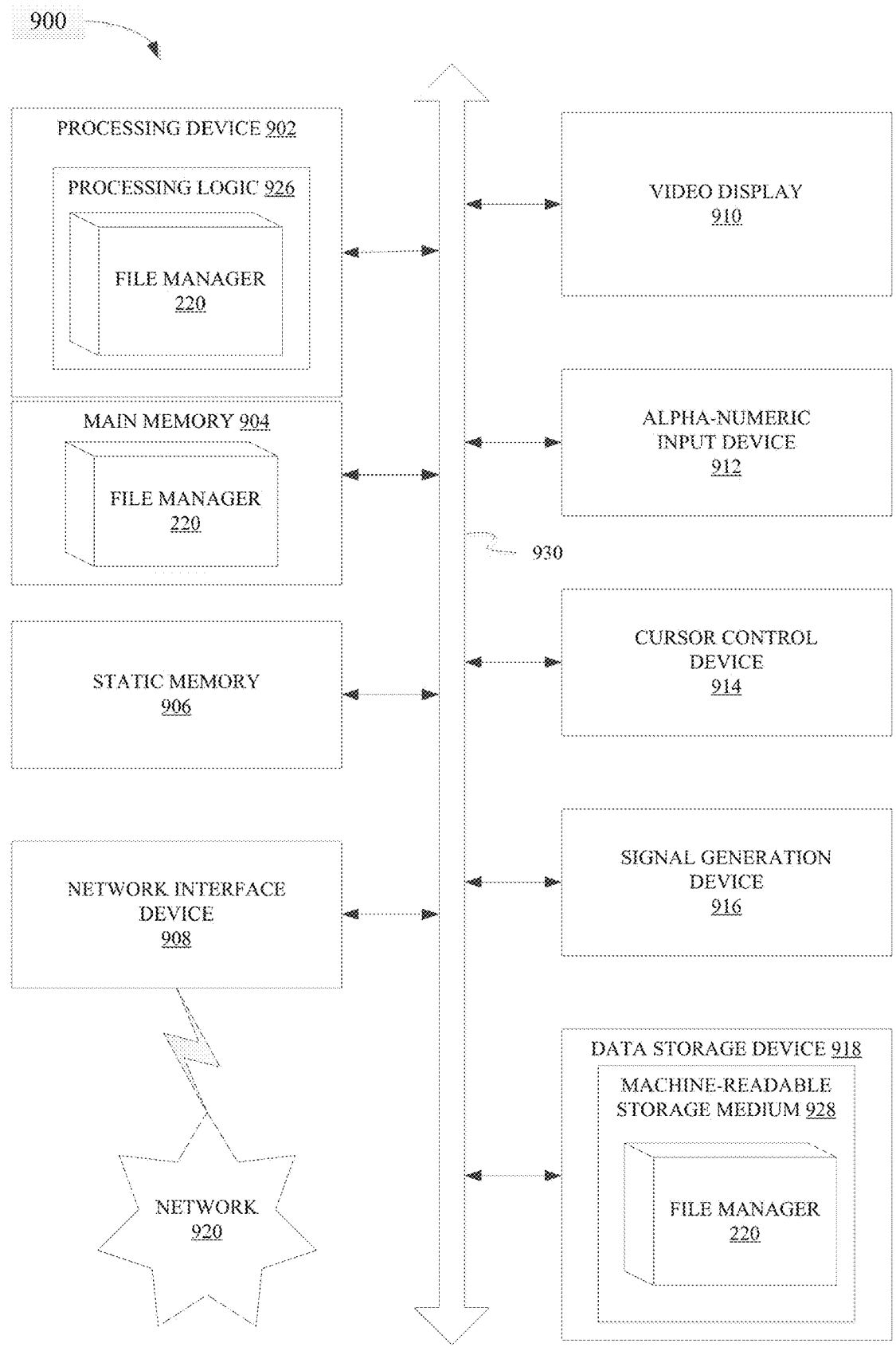
FIG. 9 is a schematic block diagram that provides one example illustration of a computing device executing a file manager, according to various embodiments of the present disclosure.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent file manager 220 of FIG. 1.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for a file manager 220 for performing the operations discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions of the file manager 220 embodying any one or more of the methodologies or functions described herein. The instructions may also reside, completely or at least partially, within the main memory 904 and/or within processing logic 926 of the processing device 902 during execution thereof by the computer system 900, the main memory 904 and the processing device 902 also constituting computer-readable media.

The instructions may further be transmitted or received over a network 920 via the network interface device 908. While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "computing", "generating", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving an instruction to store data in a filesystem, wherein the data has a first size;
creating, by a processing device, a file having a second size in the filesystem, wherein the file is a sparse file and the second size is smaller than the first size;
receiving a plurality of portions of the data, wherein a cumulative size of the plurality of portions is smaller than or equal to the second size;
storing the plurality of portions of the data in the file;

after receiving the plurality of portions of the data, receiving a last portion of the data, wherein the last portion comprises a byte at an end of the data, wherein a cumulative size of the plurality of portions and the last portion is equal to the first size;
in response to receiving the last portion of the data, increasing a size of the file from the second size to the first size by the processing device, wherein prior to receiving the last portion the file has the second size;
storing the last portion of the data in the file, wherein the file becomes a complete file as a result of storing the last portion of the data;
determining, by the processing device, that the file has increased from the second size to the first size;
determining, because the file has increased from the second size to the first size, that the data has been stored in the file; and
generating an indication that the data has been stored in the file.

2. The method of claim 1, further comprising:
establishing, by the processing device, a plurality of connections with an additional device; and
receiving at least some of the plurality of portions of the data in parallel, wherein a first order in which the plurality of portions of the data are received does not correspond to a second order for placement of the plurality of portions of the data in the file.

3. The method of claim 1, further comprising:
receiving a second instruction to store second data in the filesystem, wherein the second data has a third size;
creating a second file having a fourth size in the filesystem, wherein the second file is a second sparse file and the fourth size is smaller than the third size;
receiving a plurality of portions of the second data, wherein a cumulative size of the plurality of portions of the second data is smaller than or equal to the fourth size;
storing the plurality of portions of the second data in the second file;
receiving a request to identify whether the second data has been stored in the second file;
determining that a current size of the second file is less than the third size;
determining, because the current size of the second file is less than the third size, that the second data has not been stored in the second file; and
generating an indication that the second file is an incomplete file.

4. A method comprising:
receiving an indication of data to store in a filesystem, wherein the data has a first size;
creating a file having a second size in the filesystem, wherein the second size is different from the first size;
receiving a plurality of portions of the data;
storing the plurality of portions of the data in the file;
after receiving the plurality of portions of the data, receiving a last portion of the data;
in response to receiving the last portion of the data, changing a size of the file from the second size to the first size;
storing the last portion of data in the file;
determining that the size of the file changed from the second size to the first size; and
determining a first property of the file because the file changed from the second size to the first size.

5. The method of claim 4, further comprising:
performing an operation associated with the file; and
subsequently removing the last portion of the data from the file, wherein the last portion of the file comprises dummy data, and wherein removing the last portion of the data from the file causes the size of the file to change to a third size, wherein the third size is different than the first size;
determining the size of the file changed to the third size; and
determining a second property, different from the first property, of the file because the size of the file changed to the third size.

6. The method of claim 4, further comprising:
determining that the second size is an odd number of bytes and the first size is an even number of bytes, wherein the first property is determined because the size of the file changed from the odd number of bytes to the even number of bytes.

7. The method of claim 4, further comprising:
determining that the second size is a composite number of bytes and the first size is a prime number of bytes, wherein the first property is determined because the size of the file changed from the composite number of bytes to the prime number of bytes.

8. The method of claim 5, wherein performing the operation comprises at least one of performing an integrity check on the file, optimizing the file, or performing an audit of the file.

9. The method of claim 4, further comprising:
receiving a second indication of second data to store in the filesystem, wherein the second data has a third size;
creating a second file having a fourth size in the filesystem, wherein the fourth size is different than the third size;
receiving a plurality of portions of the second data;
storing the plurality of portions of the second data in the second file;
comparing a current size of the second file to the third size, wherein the current size is the fourth size;
determining that a discrepancy exists between the current size and the third size; and
responsive to determining that the discrepancy exists, determining that the file does not include the first property.

10. The method of claim 4,
wherein the file becomes a complete file as a result of storing the last portion of the data.

11. The method of claim 4, wherein the file is a sparse file and the second size is smaller than the first size.

12. The method of claim 10, wherein the first property is a completeness property such that determining the first property comprises determining that the file is a complete file.

13. A system comprising:
a data store comprising a filesystem; and
a processing device operatively coupled to the data store, the processing device to:
receive an indication of data to store in the filesystem, wherein the data has a first size;
create a file having a second size in the filesystem, wherein the second size is different from the first size;
receive a plurality of portions of the data, wherein a cumulative size of the plurality of portions of the data is smaller than or equal to the second size;
store the plurality of portions of the data in the file;
after receiving the plurality of portions of the data, receive a last portion of the data;

in response to receiving the last portion of the data, change a size of the file from the second size to the first size;

store the last portion of data in the file;

determine that the size of the file changed from the second size to the first size; and determine a first property of the file because the file changed from the second size to the first size.

14. The system of claim 13, wherein the processing device is further to:

receive an indication of second data to store in the filesystem, wherein the second data has a third size;

create a second file having a fourth size in the filesystem, wherein the fourth size is different from the third size;

receive a plurality of portions of the second data, wherein a cumulative size of the plurality of portions of the second data is smaller than or equal to the fourth size;

store the plurality of portions of the second data in the second file;

compare a current size of the file to the third size, wherein the current size is the fourth size;

determine that a discrepancy exists between the current size and the third size; and responsive to determining that the discrepancy exists, determine that the file does not comprise the first property.

15. The system of claim 13, wherein the file becomes a complete file as a result of storing the last portion of the data.

16. The system of claim 13, wherein the file is a sparse file and the second size is smaller than the first size.

17. The system of claim 13, wherein the processing device is further to:

establish a plurality of connections with an additional device; and receive at least some of the plurality of portions of the data in parallel, wherein a first order in which the plurality of portions of the data are received does not correspond to a second order for placement of the plurality of portions of the data in the file.

18. The system of claim 13, wherein the first property is a completeness property and to determine the first property of the file the processing device is further to:

determine that the file is a complete file.

19. The system of claim 13, wherein the first size comprises an even number of bytes and the second size comprises an odd number of bytes, and wherein the processing device is further to:

determine the first property of the file because the size of the file changed from the odd number of bytes to the even number of bytes.

20. The system of claim 13, wherein the last portion of the plurality of portions of the data is dummy data, and the processing device is further to:

perform an operation associated with the file; and subsequently remove the last portion of the data from the file, wherein removal of the last portion of the data causes the file to have a third size, wherein the third size is different than the first size; and determine the size of the file changed to the third size; and determine a second property, different from the first property, of the file because the file changed to the third size.

\* \* \* \* \*